Jan. 18, 1927.
H. LUNDQUIST
FLOW REGISTERING GAUGE
Filed April 23, 1921
1,614,529
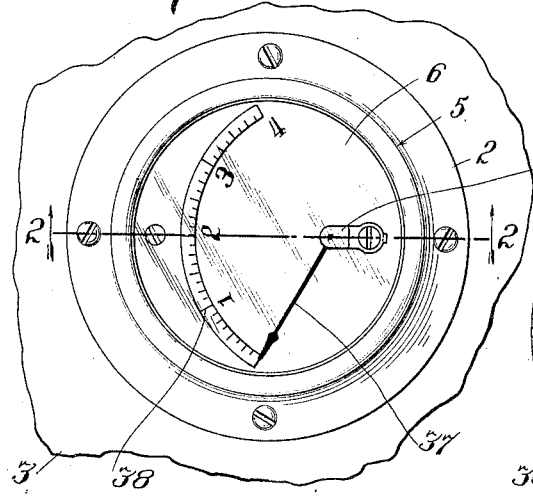
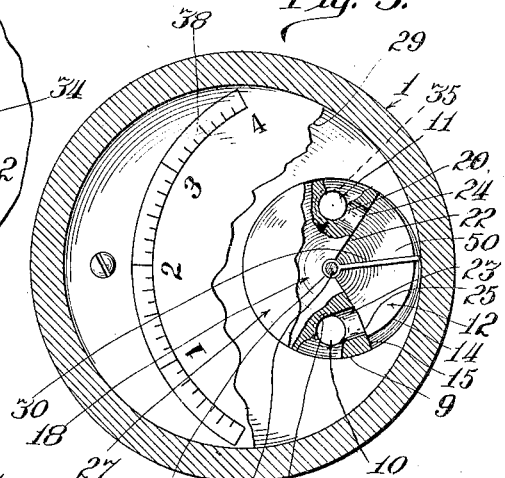
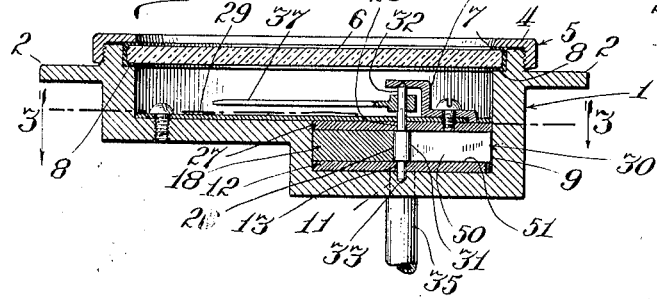
Inventor
Hans Lundquist
By Daniel F Brennan.
Attorney Patented Jan. 18, 1927.

1,614,529

UNITED STATES PATENT OFFICE.

HANS LUNDQUIST, OF CHICAGO, ILLINOIS, ASSIGNOR TO UNITED STATES SPECIALTY CORPORATION, OF CHICAGO, ILLINOIS, A CORPORATION OF ILLINOIS.

FLOW-REGISTERING GAUGE.

Application filed April 23, 1921. Serial No. 463,826.

This invention relates to improvements in flow-registering gauges.

It is an object of the invention to provide a gauge which will indicate the instantaneous rate of flow of gasoline or other fluid through the same, and which is sufficiently sensitive to respond to slight changes in the rate of flow.

While the scope of use and possible installation of the gauge is unlimited, I prefer to employ the same on automobiles and other motor-vehicles employing liquid fuel directly in the fuel line and with this end in view have so constructed the gauge that the rate of flow in unit measurements per any predetermined period of time is accurately indicated on a calibrated scale in full view of the driver, whereby he is enabled to determine the fuel consumption at any particular time of observation. Furthermore by simultaneously observing the speedometer or other indicator of the speed of the vehicle, the driver may by a simple computation, arrive at the fuel consumption of the engine per mile at the particular time the observation is made, and thus he may keep himself apprised at all times of the performance and efficiency of the engine in actual service. For this, and other reasons well known to those skilled in the art, the invention finds its greatest utility in its installation upon an automobile.

It is also an object of the invention to provide an instrument of this character which, while interposed in the main fuel line and measuring the rate of flow of gasoline or other fluids through the same, will in no way impede this flow and will, therefore, not interfere with the operation of the mechanism which is to be driven by the fluid passing through the device.

With these and other objects in view, an embodiment of the invention is illustrated in the accompanying drawings.

In the drawings:

Fig. 1 is a top view of the complete device attached to the dash board of an automobile;

Fig. 2 is a central vertical section through the device taken on line 2—2 of Fig. 1;

Fig. 3 is a horizontal section on line 3—3 of Fig. 2; and

Figs. 4, 5, 6 and 7 are perspective views of details of the instrument.

A substantially circular casing 1 is provided with an annular radial flange 2, whereby it may be secured to some part of an automobile, as for instance, to the dash board, a portion of which is indicated at 3. A circular threaded flange 4 projecting from the casing may serve for receiving a threaded ring 5 which acts as a means for holding a plate of glass 6 in operative position, the edge of this glass being protected by suitable vibration absorbing material, and this circular edge of the glass rests on a shoulder 8 of the casing 1.

The casing furthermore is provided in its bottom with a circular recess or pocket 9, which is disposed eccentrically to the axis of the casing and which has openings 10 and 11 in its bottom.

An approximately circular plate 12 with a central opening 13 is located within the pocket 9, the circumferential edge of the plate 12 for its greater part conforming to a curve with the opening 13 as its axis, and said edge having a cam-like portion 14 described about a curved line eccentric to the opening 13, whereby to provide a shoulder or abutment 15 in the edge of the plate. This plate also is provided with substantially diametrically oppositely located openings 16 and 17 extending through the same and communicating with the openings 10 and 11 in the bottom of the pocket 9, when the plate is placed in operative position on the bottom of said pocket.

This plate is covered by a body 18 of sector shape, the arc of the body portion in the embodiment shown being considerably greater than 180 degrees. The length of the arc of the "open" part 50 of the sector 18 corresponds to the length of the portion 14 on the plate 12. The lower surface of this sector is provided with substantially curved bores 19 and 20, which have the same distance from the center of the sector as the openings 16 and 17 and register therewith, respectively. The two radial walls 21 and 22 defining the "open" part or chamber 50 also are provided with bores 24 and 23 which communicate with and form continuations of the bores 19 and 20, respectively, whereby the fluid which may enter the bore 19 will flow through the passage 24 and fluid entering the bore 23 will be discharged through the communicating bore 20. The wall 21 has an angularly deflected portion 25, the end of which overlies and registers with the shoulder 15 of the plate 12 when the parts are assembled. An axial groove 26 extends through this sector plate 18, as shown in Fig. 5.

The sector plate 18 is covered by a circular plate 27 which is provided with a central opening 28, and the entire structure comprising the bottom plate 12, the sector plate 18 and the cover plate 27, is seated in the pocket 9. This structure is retained in said pocket by a scale plate 29 fastened to the bottom of the casing 1 by a screw or in some other suitable way. This scale plate 29 is preferably circular so as to fill the circular interior of the casing, and it is provided with an opening which may be brought into registration with the aligned openings 13 and 28 in the plates 12 and 27.

In the chamber 50, confined laterally by the walls 21 and 22 of the sector plate 18, a movable member 30 is located, which, in the present case, is constructed as a pivotal wing or vane combined with a vertical sleeve 31 which is secured to the spindle 32. The pointed ends of this spindle act as journals and are supported to move with very little friction in a suitable socket 33 at the bottom of the pocket 9 and in a bracket 34, respectively, which is secured to the top plate 27 by a screw or the like. The sleeve 31 on the spindle 32 has a diameter so as to fit into the groove 26 of the sector plate and the height of the sleeve also corresponds to the thickness of this plate.

The member 30 will assume within the chamber 50 different positions by swinging about the axis of the plate 18, and these positions depend upon the force with which the fluid discharged from the bore 24 acts upon the plate. This bore communicates through the vertical bore 19 with the inlet opening 11 to which a pipe 35 is secured. This pipe leads from the fuel tank (not shown), whereby the device may be used as an instrument for instantaneously measuring the quantitative rate of flow of liquid fuel. This fuel, flowing through the pipe 35, opening 11, and bores 19 and 24, acts upon the vane 30 and swings the same, escaping then through the passageway which is afforded by confined between the reduced curved edge portion 14 of the plate 12, the bottom edge 51 of the vane 30, the wall of the pocket 9, and the bottom of this pocket. The outer edge 52 of the vane 30 moves quite closely to the inner surface of the pocket, thereby preventing the fuel from escaping largely between this front edge and the inner surface.

The extent to which the vane is moved by the pressure of fuel flowing therethrough, is indicated by a pointer 37 which is fastened to that part of the spindle 32 which projects above the plate 29. This pointer plays above the scale plate, the latter being provided with calibrated gradation markings 38, concentric to the axis of the spindle. While these gradation marks could read in degrees of the arc or in weight units, they preferably are designated to indicate the rate of flow per second in gallons of fuel, producing that pressure which leads to the deflection of the vane. This consumption of fuel per second obviously will vary with the operating conditions of the engnie, speed and load and with different engines.

The entire device can readily be fastened to a part of the automobile, as for instance, the dash board 3, and will, therefore, show the driver whether an undue amount of fuel is being consumed at any instant, and by computing together the speed and flow whether the consumption of fuel per unit of travel length is in accordance with the specifications.

I claim:

1. In a flow registering gauge, in combination, a casing having a pocket, means in said pocket for cooperation with the wall of the pocket to form a chamber, separate wall portions, one of which is curvilinearly reduced and cooperates with the walls of the pocket to afford a recess of gradually increasing area, and a flow sensitive movable abutment in said chamber traversing a wall of said pocket.

2. In a flow-registering gauge, a sector body having walls forming a chamber and provided with inlet and outlet openings respectively, a movable fluid actuated member pivotally supported in the center of said sector and adapted to swing between the walls of the same, the bottom of the chamber formed by the said walls having curved edge portions of a diameter different from that of the sector, to afford a passageway of gradually increasing size around said fluid member, whereby the fluid acting on the member may flow along the said edge portion from one wall to another.

3. A flow-registering gauge comprising a sector body having radial walls at an angle to each other, the walls having inlet and outlet openings, respectively, for a fluid, a bottom plate of the same diameter as the sector and having a gradually receding edge portion extending from a point adjacent one radial wall to the other, a circular top plate of the same diameter as the sector, and a movable vane pivotally supported between the radial walls of the sector and the plates, and having a length equal to the radius of said sector and arranged to swing under the influence of the fluid coming from the inlet, the area of the passageway formed by the lower edge of said vane and the receding edge portion of the bottom plate gradually increasing from the inlet wall towards the outlet wall.

4. In a flow-registering gauge, a sector body having radial walls, a circular pocket in which the sector body is seated, a vane pivotally mounted to swing from one wall of the sector body to the other, a top and bottom plate respectively, at opposite sides of the sector, the top plate being of the same diameter as the sector, the bottom plate having a gradually receding edge portion between the radial walls of the sector, whereby in the swinging movement of the vane, due to the pressure of fluid passing from one wall to the other, a passage for the fluid is provided along the receding edge of the bottom plate below the bottom edge of the vane and said pocket which gradually increases with the increase of flow.

5. In a flow-registering gauge, a sector having a circular outer wall and radial walls provided with inlet and outlet openings respectively, a circular pocket in which the sector is seated, a top plate covering the sector between said radial walls, a circular bottom plate having a non-circular edge portion between the end points of an arc portion between the end points of an arc corresponding to the arc between the radial walls of the sector, and a fluid actuated vane pivotally mounted in the center of the sector adapted to swing in the chamber formed by the radial walls and by the plates at both ends of the sector, said vane having a radius equal to the radius of the sector.

6. In a flow registering gauge, the combination of a sector body having radial walls, a casing having a pocket in which said sector body is disposed, walls above and below said sector body and cooperating with the radial walls of the sector and a portion of the wall of the pocket to afford a chamber, one of said second mentioned walls having a receding outer edge, and a fluid actuated vane movable in said chamber in accordance with pressure of fluid flowing through said chamber, and indicating means connected with said vane.

7. In a flow registering gauge, the combination of a casing having a pocket, a sector body in said pocket, top and bottom walls for said sector, said top and bottom walls coacting with the radial walls of said sector and a wall of said pocket to form a chamber, one of the first mentioned walls having a curved receding portion located within the confines of said radial walls, a fluid velocity pressure actuated vane mounted for pivotal movement in said chamber, and indicating means connected with said vane.

8. In a flow-registering gauge, the combination of a substantially circular casing, a cylindrical pocket eccentrically disposed with respect to said casing, a sector plate mounted in said pocket, said sector plate having a chamber defined by radial walls and top and bottom walls and a portion of the wall of said pocket, a fluid actuated vane movable in said chamber about the center of the pocket, and an indicator functionally connected with said vane to move with the same at a predetermined ratio of speed.

9. In a flow registering gauge, a casing provided with a circular pocket, a circular plate in said pocket having its periphery provided with an eccentric portion affording with the bottom and one wall of the pocket a passageway of gradually increasing area, a sector on said plate provided with divergent radial walls, a cover defining with said walls, bottom and side wall of the pocket, a segmental chamber, an inlet and an outlet to said chamber formed in said divergent walls, and a vane member in said chamber lying partially over said passageway, and movable responsive to the rate of flow of fluid through the chamber.

10. In a flow-registering gauge, a casing provided with a circular pocket, a circular plate in said pocket having its periphery provided with an eccentric portion affording with the bottom and one wall of the pocket a passageway of gradually increasing area, a sector on said plate provided with divergent radial walls, a cover defining with said walls, a bottom segmental chamber, an inlet and an outlet to said chamber formed in said divergent walls, means in said chamber partially disposed over said passageway, and movable in response to the rate of flow of fluid through said chamber, and an indicating member connected to said flow responsive means.

In testimony whereof, I affix my signature.

HANS LUNDQUIST.